US012044296B2

(12) United States Patent
Stafsholt et al.

(10) Patent No.: US 12,044,296 B2
(45) Date of Patent: Jul. 23, 2024

(54) POWER SHIFT TRANSMISSION

(71) Applicant: DEERE & COMPANY, Moline, IL (US)

(72) Inventors: Kevin B. Stafsholt, Waterloo, IA (US); Andrew D. Dostal, Waterloo, IA (US); Benjamin E. Shores, Cedar Falls, IA (US); Brett D. McClain, Hudson, IA (US); Ajit R. Behera, Cedar Falls, IA (US); Amber R. Mischel, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 189 days.

(21) Appl. No.: 17/647,541

(22) Filed: Jan. 10, 2022

(65) Prior Publication Data
US 2023/0193982 A1 Jun. 22, 2023

Related U.S. Application Data

(60) Provisional application No. 63/265,731, filed on Dec. 20, 2021.

(51) Int. Cl.
F16H 3/093 (2006.01)
F16H 3/08 (2006.01)
(52) U.S. Cl.
CPC ..... F16H 3/093 (2013.01); F16H 2003/0818 (2013.01); F16H 2003/0822 (2013.01); F16H 2200/0078 (2013.01); F16H 2200/0082 (2013.01)

(58) Field of Classification Search
CPC ............ F16H 3/093; F16H 2003/0818; F16H 2003/0822; F16H 2200/0078; F16H 2200/0082
USPC .......................................... 74/331
See application file for complete search history.

(56) References Cited

U.S. PATENT DOCUMENTS

| 4,345,490 | A |   | 8/1982  | Madson         |             |
|-----------|---|---|---------|----------------|-------------|
| 4,658,672 | A |   | 4/1987  | Michael        |             |
| 4,858,495 | A |   | 8/1989  | Horsch         |             |
| 5,011,465 | A |   | 4/1991  | Jeffries et al.|             |
| 5,025,674 | A |   | 6/1991  | McAskill       |             |
| 5,063,793 | A | * | 11/1991 | McAskill       | F16H 3/093  |
|           |   |   |         |                | 74/331      |
| 5,117,702 | A | * | 6/1992  | Rodeghiero     | F16H 3/091  |
|           |   |   |         |                | 74/359      |
| 5,178,039 | A |   | 1/1993  | Shirley et al. |             |

(Continued)

FOREIGN PATENT DOCUMENTS

DE 19918732 A1 11/2000
DE 102011081520 A1 3/2012
(Continued)

OTHER PUBLICATIONS

German Search Report issued in application No. DE102022210686.5 dated May 25, 2023, 10 pages.

Primary Examiner — Ha Dinh Ho

(57) ABSTRACT

A power shift transmission includes a plurality of shafts, a plurality of gears, a plurality of clutches, a plurality of forward modes, and a plurality of alternate forward modes. Each forward mode has a distinct transmission ratio, and each alternate forward mode has a transmission ratio similar to one of the plurality of forward modes.

27 Claims, 16 Drawing Sheets

(56) References Cited

U.S. PATENT DOCUMENTS

| | | | |
|---|---|---|---|
| 5,245,892 A * | 9/1993 | Kim | F16H 37/043 74/342 |
| 5,249,475 A | 10/1993 | McAskill | |
| 5,573,471 A * | 11/1996 | Shubinsky | F16H 37/046 475/322 |
| 6,845,682 B1 * | 1/2005 | Bulgrien | F16H 3/66 74/331 |
| 8,596,157 B2 * | 12/2013 | Vu | F16H 37/043 74/331 |
| 9,879,761 B2 | 1/2018 | Vu | |
| 10,086,686 B2 | 10/2018 | Mueller et al. | |
| 10,240,668 B2 | 3/2019 | Raisch | |
| 2020/0284322 A1 | 9/2020 | Müller et al. | |
| 2020/0284323 A1 | 9/2020 | Müller et al. | |
| 2020/0284324 A1 | 9/2020 | Gugel et al. | |
| 2020/0284340 A1 | 9/2020 | Müller et al. | |
| 2020/0362950 A1 | 11/2020 | Raisch | |
| 2020/0400217 A1 | 12/2020 | Billich | |
| 2021/0123511 A1 | 4/2021 | Eisenhardt et al. | |
| 2021/0123513 A1 | 4/2021 | Raisch | |

FOREIGN PATENT DOCUMENTS

| | | |
|---|---|---|
| DE | 102013114446 A1 | 6/2014 |
| DE | 102014111255 A1 | 2/2015 |
| DE | 102020121209 A1 | 2/2022 |
| WO | WO 2013184751 A1 | 12/2013 |

* cited by examiner

| Shaft | Gear | Number of Teeth |
|---|---|---|
| IS | G1 | 55 |
| IS | G2 | 52 |
| CS1 | G3 | 71 |
| CS1 | G4 | 50 |
| CS1 | G5 | 74 |
| CS1 | G6 | 77 |
| CS1 | G7 | 65 |
| CS1 | G8 | 83 |
| CS2 | G9 | 50 |
| CS2 | G10 | 79 |
| CS2 | G11 | 69 |
| CS2 | G12 | 33 |
| CS2 | G13 | 79 |
| CS2 | G14 | 59 |
| CS2 | G15 | 100 |
| OS | G16 | 64 |
| OS | G17 | 82 |
| OS | G18 | 44 |
| IS | RG1 | 45 |
| REV | RG2 | 43 |

FIG. 4A

| Group of Gears | Associated Clutch | Shafts |
|---|---|---|
| G1, G3 | HC | IS, CS1 |
| RG1, RG2, RG3 | RC | IS, RS, RC1 |
| G2, G6 | LC | IS, CS1 |
| G4, G10 | S1 | CS1, CS2 |
| G5, G11 | S3 | CS1, CS2 |
| G7, G13 | S2 | CS1, CS2 |
| G8, G14 | S4 | CS1, CS2 |
| G9, G16 | B | CS2, OS |
| G12, G17 | A | CS2, OS |
| G15, G18 | C | CS2, OS |

FIG. 4B

| | Low | Hi | R | 81 | 82 | 83 | 84 | A | B | C |
|---|---|---|---|---|---|---|---|---|---|---|
| F1 | X | | | X | | | | X | | |
| F2 | | X | | X | | | | X | | |
| F3 | X | | | | X | | | X | | |
| F4 | | X | | | X | | | X | | |
| F5 | X | | | | | X | | X | | |
| F6a | | X | | | | X | | X | | |
| F7a | X | | | | | | X | X | | |
| F8a | | X | | | | | X | X | | |
| F6b | X | | | X | | | | | X | |
| F7b | | X | | X | | | | | X | |
| F8b | X | | | | X | | | | X | |
| F9 | | X | | | X | | | | X | |
| F10 | X | | | | | X | | | X | |
| F11 | | X | | | | X | | | X | |
| F12 | X | | | | | | X | | X | |
| F13 | | X | | | | | X | | X | |
| F14 | X | | | X | | | | | | X |
| F15 | | X | | X | | | | | | X |
| F16 | X | | | | X | | | | | X |
| F17 | | X | | | X | | | | | X |
| F18 | X | | | | | X | | | | X |
| F19 | | X | | | | X | | | | X |
| F20 | X | | | | | | X | | | X |
| F21 | | X | | | | | X | | | X |

FIG. 5

| | H/L/R | Speed | Range | First Group | | Second Group | | Third Group | | Ratio | % Step |
|---|---|---|---|---|---|---|---|---|---|---|---|
| F1 | L | S1 | A | G2 | G6 | G4 | G10 | G12 | G17 | 5.814 | |
| F2 | H | S1 | A | G1 | G3 | G4 | G10 | G12 | G17 | 5.068 | 14.7% |
| F3 | L | S2 | A | G2 | G6 | G7 | G13 | G12 | G17 | 4.472 | 13.3% |
| F4 | H | S2 | A | G1 | G3 | G7 | G13 | G12 | G17 | 3.899 | 14.7% |
| F5 | L | S3 | A | G2 | G6 | G5 | G11 | G12 | G17 | 3.431 | 13.6% |
| F6a | H | S3 | A | G1 | G3 | G5 | G11 | G12 | G17 | 2.991 | * |
| F7a | L | S4 | A | G2 | G6 | G8 | G14 | G12 | G17 | 2.616 | * |
| F8a | H | S4 | A | G1 | G3 | G8 | G14 | G12 | G17 | 2.280 | * |
| F6b | L | S1 | B | G2 | G6 | G4 | G10 | G9 | G17 | 2.995 | * |
| F7b | H | S1 | B | G1 | G3 | G4 | G10 | G9 | G17 | 2.611 | * |
| F8b | L | S2 | B | G2 | G6 | G7 | G13 | G9 | G17 | 2.304 | * |
| F9 | H | S2 | B | G1 | G3 | G7 | G13 | G9 | G16 | 2.008 | * |
| F10 | L | S3 | B | G2 | G6 | G5 | G11 | G9 | G16 | 1.767 | 13.6% |
| F11 | H | S3 | B | G1 | G3 | G5 | G11 | G9 | G16 | 1.541 | 14.7% |
| F12 | L | S4 | B | G2 | G6 | G8 | G14 | G9 | G16 | 1.347 | 14.4% |
| F13 | H | S4 | B | G1 | G3 | G8 | G14 | G9 | G16 | 1.175 | 14.7% |
| F14 | L | S1 | C | G2 | G6 | G4 | G10 | G9 | G16 | 1.029 | 14.1% |
| F15 | H | S1 | C | G1 | G3 | G4 | G10 | G15 | G18 | 0.897 | 14.7% |
| F16 | L | S2 | C | G2 | G6 | G7 | G13 | G15 | G18 | 0.792 | 13.3% |
| F17 | H | S2 | C | G1 | G3 | G7 | G13 | G15 | G18 | 0.690 | 14.7% |
| F18 | L | S3 | C | G2 | G6 | G5 | G11 | G15 | G18 | 0.608 | 13.6% |
| F19 | H | S3 | C | G1 | G3 | G5 | G11 | G15 | G18 | 0.530 | 14.7% |
| F20 | L | S4 | C | G2 | G6 | G8 | G14 | G15 | G18 | 0.463 | 14.4% |
| F21 | H | S4 | C | G1 | G3 | G8 | G14 | G15 | G18 | 0.404 | 14.7% |

FIG. 6

| | H/L/R | Speed | Range | First Group | | Second Group | | Third Group | | Ratio | % Step |
|---|---|---|---|---|---|---|---|---|---|---|---|
| F5 | L | S3 | A | G2 | G6 | G5 | G11 | G12 | G17 | 3.431 | 13.6% |
| F6a | H | S3 | A | G1 | G3 | G5 | G11 | G12 | G17 | 2.991 | 14.7% |
| F7a | L | S4 | A | G2 | G6 | G8 | G14 | G12 | G17 | 2.616 | 14.4% |
| F8a | H | S4 | A | G1 | G3 | G8 | G14 | G12 | G17 | 2.280 | 14.7% |
| F9 | H | S2 | B | G1 | G3 | G7 | G13 | G9 | G16 | 2.008 | 13.5% |

FIG. 7A

| | H/L/R | Speed | Range | First Group | | Second Group | | Third Group | | Ratio | % Step |
|---|---|---|---|---|---|---|---|---|---|---|---|
| F5 | L | S3 | A | G2 | G6 | G5 | G11 | G12 | G17 | 3.431 | 13.6% |
| F6b | L | S1 | B | G2 | G6 | G4 | G10 | G9 | G16 | 2.995 | 14.6% |
| F7b | H | S1 | B | G1 | G3 | G4 | G10 | G9 | G16 | 2.611 | 14.7% |
| F8b | L | S2 | B | G2 | G6 | G7 | G13 | G9 | G16 | 2.304 | 13.3% |
| F9 | H | S2 | B | G1 | G3 | G7 | G13 | G9 | G16 | 2.008 | 14.7% |

FIG. 7B

| | Low | Hi | R | 81 | 82 | 83 | 84 | A | B | C |
|---|---|---|---|---|---|---|---|---|---|---|
| R1 | | | X | X | | | | | | |
| R2 | | | X | | X | | | X | | |
| R3 | | | X | | | X | | X | | |
| R4a | | | X | | | | X | X | | |
| R4b | | | X | X | | | | X | | |
| R5 | | | X | | X | | | | X | |
| R6 | | | X | | | X | | | X | |
| R7 | | | X | X | | | X | | X | |
| R8 | | | X | | X | | | | | X |
| R9 | | | X | | | X | | | | X |
| R10 | | | X | | | | X | | | X |
| R11 | | | X | | | | | | | X |

FIG. 10

|  | H/L/R | Speed | Range | First Group | | Second Group | | Third Group | | Ratio | % Step |
|---|---|---|---|---|---|---|---|---|---|---|---|
| R1 | R | S1 | A | RG1 | RG2 | G4 | G10 | G12 | G17 | 6.466 | |
| R2 | R | S2 | A | RG1 | RG2 | G7 | G13 | G12 | G17 | 4.966 | 30.0% |
| R3 | R | S3 | A | RG1 | RG2 | G5 | G11 | G12 | G17 | 3.810 | 30.3% |
| R4a | R | S4 | A | RG1 | RG2 | G8 | G14 | G12 | G17 | 2.905 | * |
| R4b | R | S1 | B | RG1 | RG2 | G4 | G10 | G9 | G16 | 3.326 | * |
| R5 | R | S2 | B | RG1 | RG2 | G7 | G13 | G9 | G16 | 2.558 | * |
| R6 | R | S3 | B | RG1 | RG2 | G5 | G11 | G9 | G16 | 1.963 | 30.3% |
| R7 | R | S4 | B | RG1 | RG2 | G8 | G14 | G9 | G16 | 1.496 | 31.2% |
| R8 | R | S1 | C | RG1 | RG2 | G4 | G10 | G15 | G18 | 1.143 | 30.9% |
| R9 | R | S2 | C | RG1 | RG2 | G7 | G13 | G15 | G18 | 0.879 | 30.0% |
| R10 | R | S3 | C | RG1 | RG2 | G5 | G11 | G15 | G18 | .675 | 30.3% |
| R11 | R | S4 | C | RG1 | RG2 | G8 | G14 | G15 | G18 | .514 | 31.2% |

FIG. 11

|  | H/L/R | Speed | Range | First Group | | | Second Group | | Third Group | | Ratio | % Step |
|---|---|---|---|---|---|---|---|---|---|---|---|---|
| R3 | R | S3 | A | RG1 | RG2 | G5 | G5 | G11 | G12 | G17 | 3.810 | 30.3% |
| R4a | R | S4 | A | RG1 | RG2 | G5 | G8 | G14 | G12 | G17 | 2.905 | 31.2% |
| R5 | R | S2 | B | RG1 | RG2 | G5 | G7 | G13 | G9 | G16 | 2.558 | 13.5% |

FIG. 12A

|  | H/L/R | Speed | Range | First Group | | | Second Group | | Third Group | | Ratio | % Step |
|---|---|---|---|---|---|---|---|---|---|---|---|---|
| R3 | R | S3 | A | RG1 | RG2 | G5 | G5 | G11 | G12 | G17 | 3.810 | 30.3% |
| R4b | R | S1 | B | RG1 | RG2 | G5 | G4 | G10 | G9 | G16 | 3.326 | 14.6% |
| R5 | R | S2 | B | RG1 | RG2 | G5 | G7 | G13 | G9 | G16 | 2.558 | 30.0% |

FIG. 12B

POWER SHIFT TRANSMISSION

CROSS-REFERENCE TO RELATED APPLICATIONS

This application claims the benefit of U.S. provisional patent application No. 63/265,731, titled POWER SHIFT TRANSMISSION, filed Dec. 20, 2021, which is hereby incorporated by reference.

FIELD OF THE DISCLOSURE

The present disclosure relates to power shift transmissions.

BACKGROUND

Power shift transmissions, or powershift transmissions, are generally used in work vehicles or machines. Power shift transmissions transmit mechanical power from a power source to a drive train of the vehicle. Power shift transmissions typically provide several gear ratios for propelling vehicles through a range of speeds.

The discussion above is merely general background information and is not intended to be used in determining the scope of the claimed subject matter.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure includes a power shift transmission with one or more forward modes and one or more alternate forward modes.

According to an aspect of the present disclosure, a power shift transmission includes a plurality of shafts, a plurality of gears, a plurality of clutches, a plurality of forward modes, each forward mode has a distinct transmission ratio, and a plurality of alternate forward modes, each alternate forward mode has a transmission ratio similar to one of the plurality of forward modes.

According to an aspect of the present disclosure, the plurality of shafts includes a first shaft, a second shaft, a third shaft, and a fourth shaft. The plurality of gears includes a first gear, a second gear, a third gear, a fourth gear, a fifth gear, a sixth gear, a seventh gear, an eighth gear, a ninth gear, a tenth gear, an eleventh gear, a twelfth gear, a thirteenth gear, a fourteenth gear, a fifteenth gear, a sixteenth gear, a seventeenth gear, and an eighteenth gear. The first shaft includes the first gear and the second gear. The second shaft includes the third gear, the fourth gear, the fifth gear, the sixth gear, the seventh gear, and the eighth gear. A third shaft includes the ninth gear, the tenth gear, the eleventh gear, the twelfth gear, the thirteenth gear, the fourteenth gear, and the fifteenth gear. A fourth shaft includes the sixteenth gear, the seventeenth gear, and the eighteenth gear.

According to an aspect of the present disclosure, the plurality of clutches includes a first clutch, a second clutch, a third clutch, a fourth clutch, a fifth clutch, a sixth clutch, a seventh clutch, an eighth clutch, and a ninth clutch. The first clutch has an engaged condition, which causes the second shaft to rotate relative to the first shaft based upon the engagement between the third gear and the first gear. The second clutch has an engaged condition, which causes the second shaft to rotate relative to the first shaft based upon the engagement between the sixth gear and the second gear. The third clutch has an engaged condition, which causes the third shaft to rotate relative to the second shaft based upon the engagement between the tenth gear and the fourth gear. The fourth clutch has an engaged condition, which causes the third shaft to rotate relative to the second shaft based upon the engagement between the thirteenth gear and the seventh gear.

The fifth clutch has an engaged condition, which causes the third shaft to rotate relative to the second shaft based upon the engagement between the eleventh gear and the fifth gear. The sixth clutch has an engaged condition, which causes the third shaft to rotate relative to the second shaft based upon the engagement between the fourteenth gear and the eighth gear. The seventh clutch has an engaged condition, which causes the fourth shaft to rotate relative to the third shaft based upon the engagement between the seventeenth gear and the twelfth gear. The eighth clutch has an engaged condition, which causes the fourth shaft to rotate relative to the third shaft based upon the engagement between the sixteenth gear and the ninth gear. The ninth clutch has an engaged condition, which causes the fourth shaft to rotate relative to the third shaft based upon the engagement between the eighteenth gear and the fifteenth gear.

According to an aspect of the present disclosure, the plurality of forward modes includes at least twenty-one forward modes, and the plurality of alternate forward modes includes at least three alternate forward modes.

According to an aspect of the present disclosure, the plurality of forward modes includes a sixth forward mode and a seventh forward mode, the at least two alternate forward modes include an alternate sixth forward mode and an alternate seventh forward mode, the sixth forward mode and the alternate sixth forward mode have a similar transmission ratios; and the seventh forward mode and the alternate seventh forward mode have a similar transmission ratios.

According to an aspect of the present disclosure, the plurality of forward modes includes an eighth forward mode, the at least two alternate forward modes include an alternate eighth forward mode, and the eighth forward mode and the alternate eighth forward mode have similar transmission ratios.

According to an aspect of the present disclosure, the plurality of forward modes includes a fifth forward mode and a shift step between the fifth forward mode and the sixth forward mode is between 10% and 20%.

According to an aspect of the present disclosure, the transmission ratio of the alternate sixth forward mode is within 10% of the transmission ratio of the sixth forward mode, the transmission ratio of the alternate seventh forward mode is within 10% of the transmission ratio of the seventh forward mode, and the transmission ratio of the alternate eighth forward mode is within 10% of the transmission ratio of the eighth forward mode.

According to an aspect of the present disclosure, the transmission ratio of the alternate sixth forward mode is within 5% of the transmission ratio of the sixth forward mode, the transmission ratio of the alternate seventh forward mode is within 5% of the transmission ratio of the seventh forward mode, and the transmission ratio of the alternate eighth forward mode is within 5% of the transmission ratio of the eighth forward mode.

According to an aspect of the present disclosure, the transmission ratio of the alternate sixth forward mode is within 2% of the transmission ratio of the sixth forward mode, the transmission ratio of the alternate seventh forward mode is within 2% of the transmission ratio of the seventh forward mode, and the transmission ratio of the alternate eighth forward mode is within 2% of the transmission ratio of the eighth forward mode.

According to an aspect of the present disclosure, the power shift transmission includes a first reverse gear operatively connected to the first shaft, a second reverse gear operatively connected to a reverse shaft, a reverse clutch having an engaged condition, which causes the second shaft to rotate relative to the first shaft based upon the engagement between the second reverse gear and the first reverse gear and the engagement between the fifth gear and the second reverse gear, a plurality of reverse modes, each reverse mode including a distinct transmission ratio, and at least one alternate reverse mode having a transmission ratio between any two of the reverse modes.

According to an aspect of the present disclosure, the plurality of reverse modes includes a third reverse mode, a fourth reverse mode, and a fifth reverse mode, the at least one alternate reverse mode includes an alternate fourth reverse mode, and the fourth reverse mode and the alternate fourth reverse mode each have a transmission ratio between a transmission ratio of the third reverse mode and a transmission ratio of the fifth reverse mode.

According to an aspect of the present disclosure, a shift step between the third reverse mode and the fourth reverse mode is between 25% and 35%.

According to an aspect of the present disclosure, the transmission ratio of the alternate fourth reverse mode is within 20% of the transmission ratio of the fourth reverse mode.

According to an aspect of the present disclosure, a work vehicle includes a power shift transmission described herein.

According to an aspect of the present disclosure, a method of shifting a power shift transmission includes determining via a controller connected to at least one sensor a shift condition from a current forward mode to a proposed forward mode, determining via a controller whether a proposed alternate forward mode is available for the shift condition, the proposed alternate forward mode has a similar transmission ratio as the proposed forward mode, determining via a controller the difference in rotational energy between the current forward mode and the proposed forward mode, determining via a controller the difference in rotational energy between the current forward mode and the proposed alternate forward mode, and shifting via a controller to one of the proposed forward mode and the proposed alternate forward mode based in part on the smaller difference in rotational energy.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which:

FIG. 4A is a diagram illustrating a number of teeth for each gear of a power shift transmission, according to an implementation;

FIG. 4B is a diagram illustrating groups of gears for a power shift transmission, according to an implementation;

FIG. 5 is a diagram illustrating forward modes of a power shift transmission, according to an implementation;

FIG. 6 is a diagram illustrating forward modes of a power shift transmission, according to an implementation;

FIG. 7A is a diagram illustrating forward modes of a power shift transmission, according to an implementation;

FIG. 7B is a diagram illustrating forward modes of a power shift transmission, according to an implementation;

FIG. 10 is a diagram illustrating reverse modes of a power shift transmission, according to an implementation;

FIG. 11 is a diagram illustrating reverse modes of a power shift transmission, according to an implementation;

FIG. 12A is a diagram illustrating reverse modes of a power shift transmission, according to an implementation;

FIG. 12B is a diagram illustrating reverse modes of a power shift transmission, according to an implementation;

Like reference numerals are used to indicate like elements throughout the several figures.

DETAILED DESCRIPTION

The implementations disclosed in the above drawings and the following detailed description are not intended to be exhaustive or to limit the present disclosure to these implementations. Rather, there are several variations and modifications which may be made without departing from the scope of the present disclosure.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of one or more functional components, logical components, and various processing steps, which may be comprised of one or more hardware, software, and firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described implementations.

Figure 1:
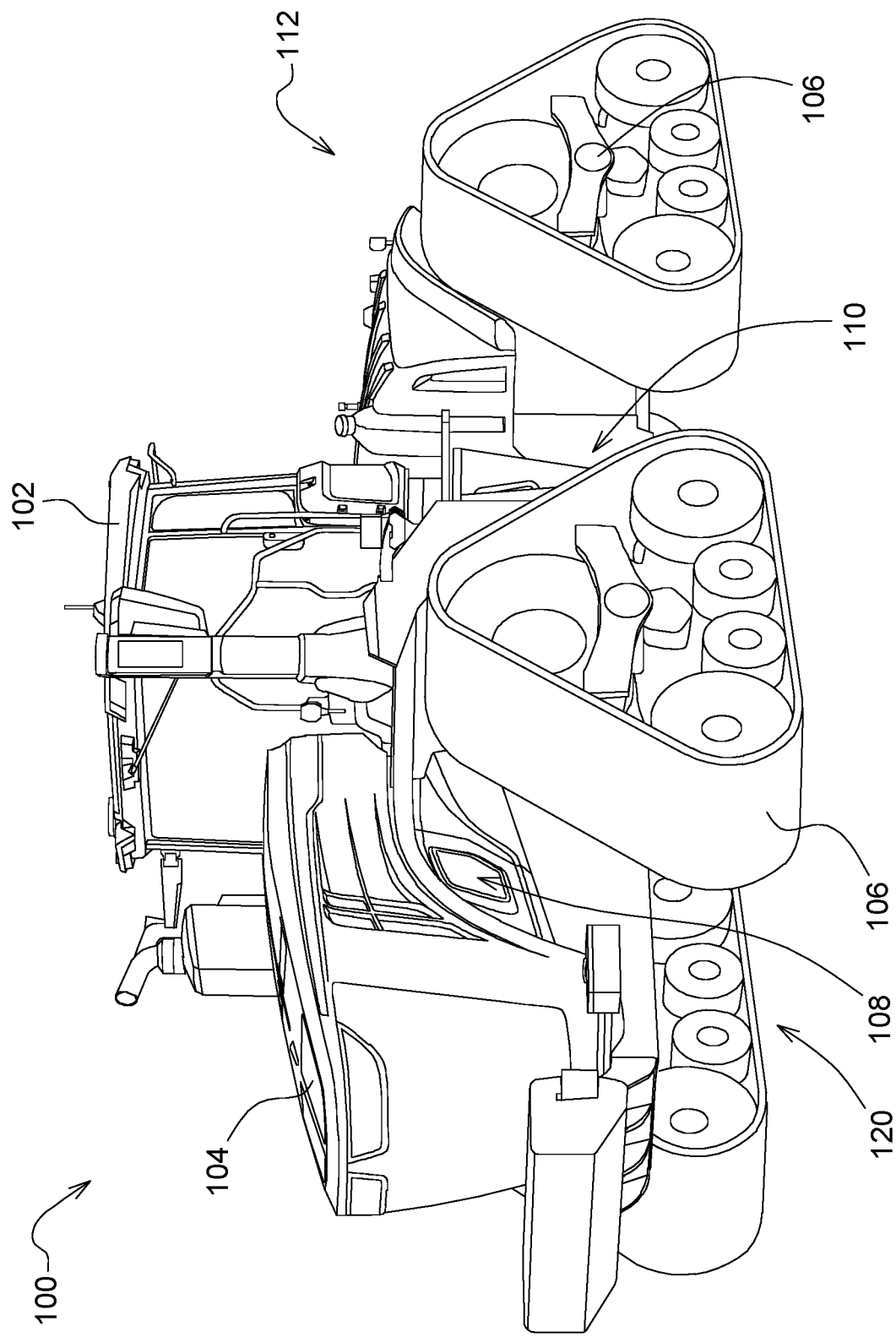
FIG. 1 is a perspective view of a work vehicle including a power shift transmission, according to an implementation.

FIG. 1 illustrates a work vehicle 100, for example an agricultural tractor. This disclosure also applies to other types of work vehicles in agriculture, construction, forestry, and road building. The work vehicle 100 can include an operator station or cab 102, a hood 104, one or more ground engaging apparatus 106, for example wheels or track assemblies, and a frame or chassis 110. The work vehicle 100 can have a rigid or an articulated frame 110. The work vehicle 100 can include one or more power sources 108, for example an internal combustion engine, a hybrid engine, or an electric or hydraulic machine. The work vehicle 100 can include a transmission 120 transferring power from the one or more power sources 108 to a drivetrain, which includes the ground engaging apparatus 106 and one or more power take off (PTO) shafts 112 or other auxiliary power outputs or inputs. The transmission 120 can include one or more electric or hydraulic machines. The work vehicle 100 can include an operator interface having any number and combination of electronic devices, such as an interactive display.

Figure 2:
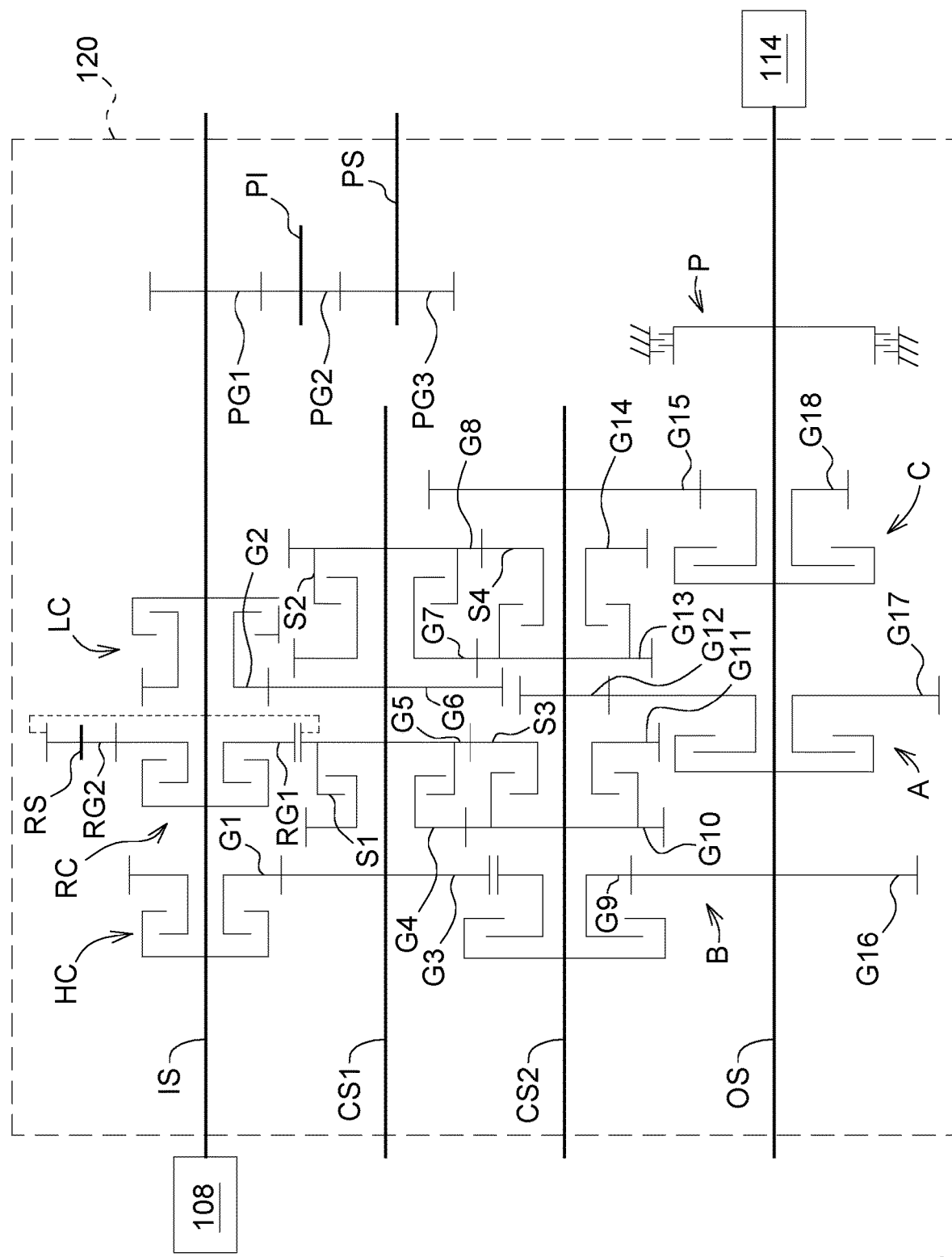
FIG. 2 is a schematic diagram of a power shift transmission, according to an implementation.

With reference to FIG. 2, the transmission 120 can include a power shift, or powershift, transmission. The transmission 120 can include a transmission housing, which provides an enclosure for the various transmission or other drivetrain components. The transmission 120 can include a plurality of shafts, gears, and clutches. One or more of the shafts or other transmission or drivetrain components may be rotatably connected to or supported by the transmission housing. The transmission 120 can include an input shaft IS, a first counter shaft CS1, a second counter shaft CS2, an output shaft OS, a reverse shaft RS, and a PTO shaft PTO. The input shaft IS can be operatively connected to any power source 108, which provides rotational power to the transmission 120. The output shaft OS can be operatively connected to a drivetrain 114 of the work vehicle 100, such as a geartrain or final drive.

Any of the gears or clutches can be fixedly or rotatably connected or attached to a shaft. Any of the gears or clutches can be arranged or mounted on a shaft and can rotate with or rotate relative to the shaft. The input shaft IS can include a first gear G1, a second gear G2, and a first reverse gear RG1. The input shaft IS can include a first PTO gear PG1. The input shaft IS can include a low clutch LC, a high clutch HC, and a reverse clutch RC. The first counter shaft CS1 can include a third gear G3, a fourth gear G4, a fifth gear G5, a sixth gear G6, a seventh gear G7, and an eighth gear G8. The first counter shaft CS1 can include a first speed clutch S1 and a second speed clutch S2.

The second counter shaft CS2 can include a ninth gear G9, a tenth gear G10, and eleventh gear G11, a twelfth gear G12, a thirteenth gear G13, a fourteenth gear 14, and a fifteenth gear G15. The second counter shaft CS2 can include a third speed clutch S3, a fourth speed clutch S4, and a second range clutch B. The output shaft OS can include a sixteenth gear G16, and a seventeenth gear G17, and an eighteenth gear G18. The output shaft OS can include a first range clutch A and a third range clutch C. The output shaft OS can include a parking brake P. The reverse shaft RS can include a second reverse RG2. A PTO intermediate shaft PI can include a second PTO gear PG2. A PTO output shaft PS can include a third PTO gear PG3.

Figure 3B:
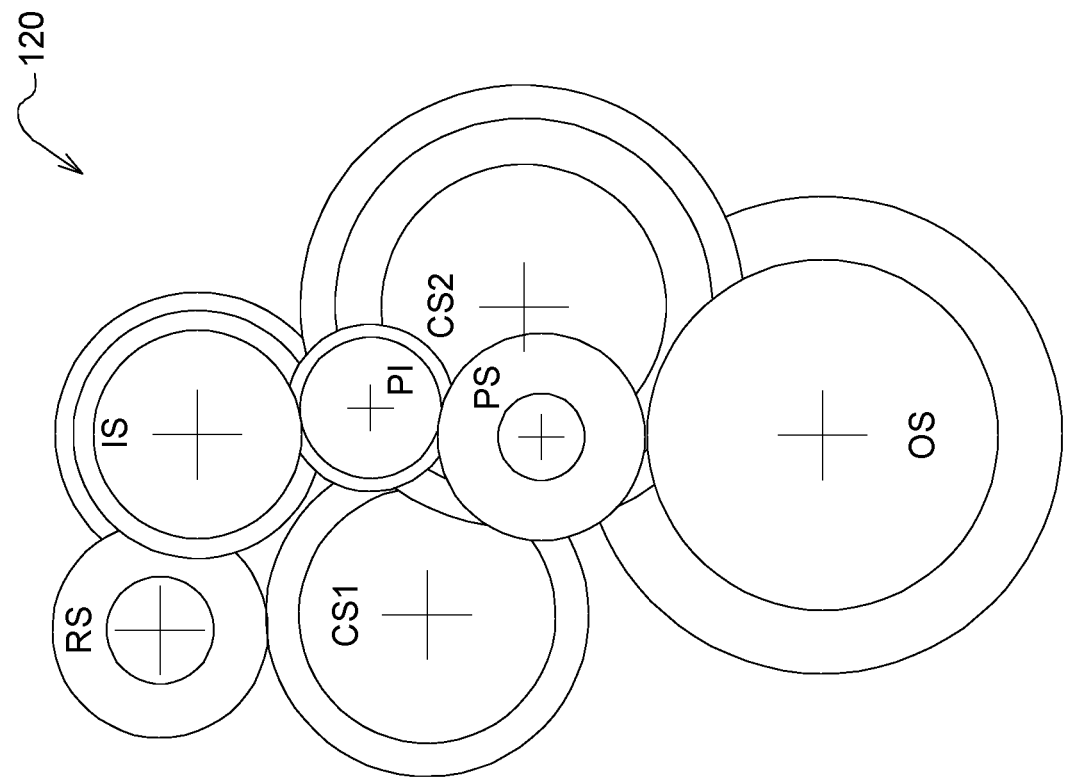
FIG. 3B is a rear perspective view of a power shift transmission, according to an implementation.
Figure 3A:
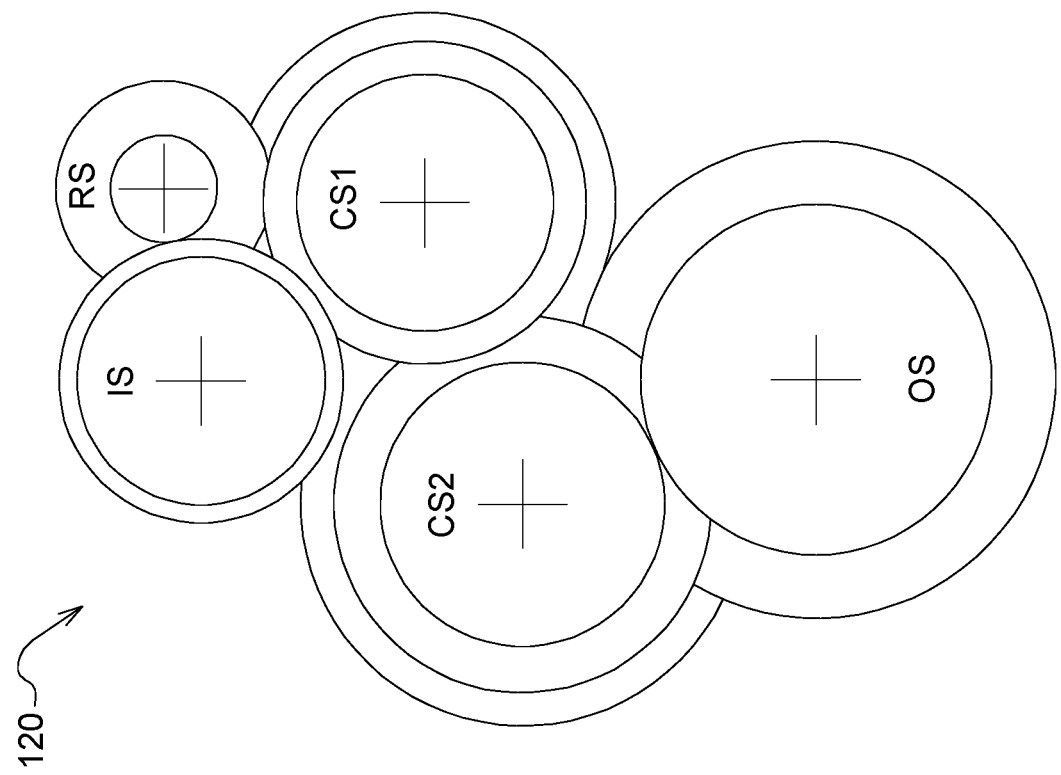
FIG. 3A is a front perspective view of a power shift transmission, according to an implementation.

FIG. 3A illustrates a front view of the relative position or arrangement of the transmission shafts in a transmission 120, according to an implementation. This arrangement depicts a relative configuration of the reverse shaft RS, the input shaft IS, the first counter shaft CS1, the second counter shaft CS2, and the output shaft OS. FIG. 3B illustrates a rear view of the relative position or arrangement of the transmission shafts in a transmission 120, according to an implementation. This arrangement depicts a relative configuration of the reverse shaft RS, the input shaft IS, the first counter shaft CS1, the second counter shaft CS2, the output shaft OS, the PTO intermediate shaft PI, and the PTO output shaft PO.

With reference to FIG. 4A, each of the gears in the transmission 120 can include any number of teeth. According to an implementation, a first gear G1 can have fifty-five teeth, a second gear G2 can have fifty-two teeth, a third gear G3 can have seventy-one teeth, a fourth gear G4 can have fifty teeth, a fifth gear G5 can have seventy-four teeth, a sixth gear G6 can have seventy-seven teeth, a seventh gear G7 can have sixty-five teeth, an eight gear G8 can have eighty-three teeth, an ninth gear G9 can have fifty teeth, an tenth gear G10 can have seventy-nine teeth, an eleventh gear G11 can have sixty-nine teeth, aa twelfth gear G12 can have thirty-three teeth, a thirteenth gear G13 can have seventy-nine teeth, a fourteenth gear G14 can have fifty-nine teeth, a fifteenth gear G15 can have one hundred teeth, a sixteenth gear G16 can have sixty-four teeth, a seventeenth gear G17 can have eighty-two teeth, and an eighteenth gear G18 can have forty-four teeth. A first reverse gear RG1 can have forty-five teeth, and a second reverse gear RG2 can have forty-three teeth. The number of teeth for each gear can vary from the implementation described above.

FIG. 4B illustrates the groups of gears and the associated clutches in a transmission 120, according to an implementation. For any group or grouping of gears, two or more gears engage or mesh with each other. A first gear in the group can be fixedly connected or attached to a first shaft, so the first gear rotates with the first shaft. A second gear in the group can be rotatably connected or attached to a second shaft, so the second gear rotates relative to the second shaft. A clutch can be associated with each group of gears. The clutch has an engaged condition and a disengaged condition. The clutch selectively engages to fix or attach the second gear to the second shaft, so the second gear rotates with the second shaft. When the clutch is engaged, or in the engaged condition, the second shaft rotates relative to the first shaft based on the ratio of the number of teeth of the second gear to the first gear. Alternatively, the first gear in the group can be rotatably connected to the first shaft, so the first gear rotates relative to the first shaft. The second gear in the group can be fixedly connected to the second shaft, so the second gear rotates with the second shaft. The clutch selectively engages to fix or attach the first gear to the first shaft, so the first gear rotates with the first shaft.

For example, the first gear G1 engages or meshes with the third gear G3 to form a group of gears. The first gear G1 can be rotatably connected to the input shaft IS and the third gear G3 can be fixedly connected to the first counter shaft CS1. The high clutch HC is associated with this group of gears. The high clutch HC can selectively engage to fix or attach the first gear G1 to the input shaft IS, so the first gear G1 rotates with the input shaft. When the high clutch is engaged, or in the engaged condition, the first counter shaft CS1 rotates relative to the input shaft IS based on the ratio of the number of teeth of the third gear G3 to the first gear G1. Alternatively, the first gear G1 can be fixedly connected to the input shaft IS and the third gear G3 can be rotatably connected to the first counter shaft CS1. The high clutch HC can selectively engage to fix or attach the third gear G3 to the first counter shaft CS1, so the third gear G3 rotates with the first counter shaft CS1.

With reference to FIGS. 5 and 6, a transmission 120 can include a plurality of forward speeds or modes. According to some implementations, the transmission 120 can include twenty-one forward modes F1-F21 and one or more alternate forward modes, which can include overlapping transmission ratios. Each of the twenty-one forward modes F1-F21 has a distinct transmission ratio. For each of the forward modes F1-F21, one of the low clutch LC and the high clutch HC is engaged; one of the first speed clutch S1, the second speed clutch S2, the third speed clutch S3, and the fourth speed clutch S4 is engaged; and one of the first range clutch A, the second range clutch B, and the third range clutch C is engaged as illustrated.

Figure 8:
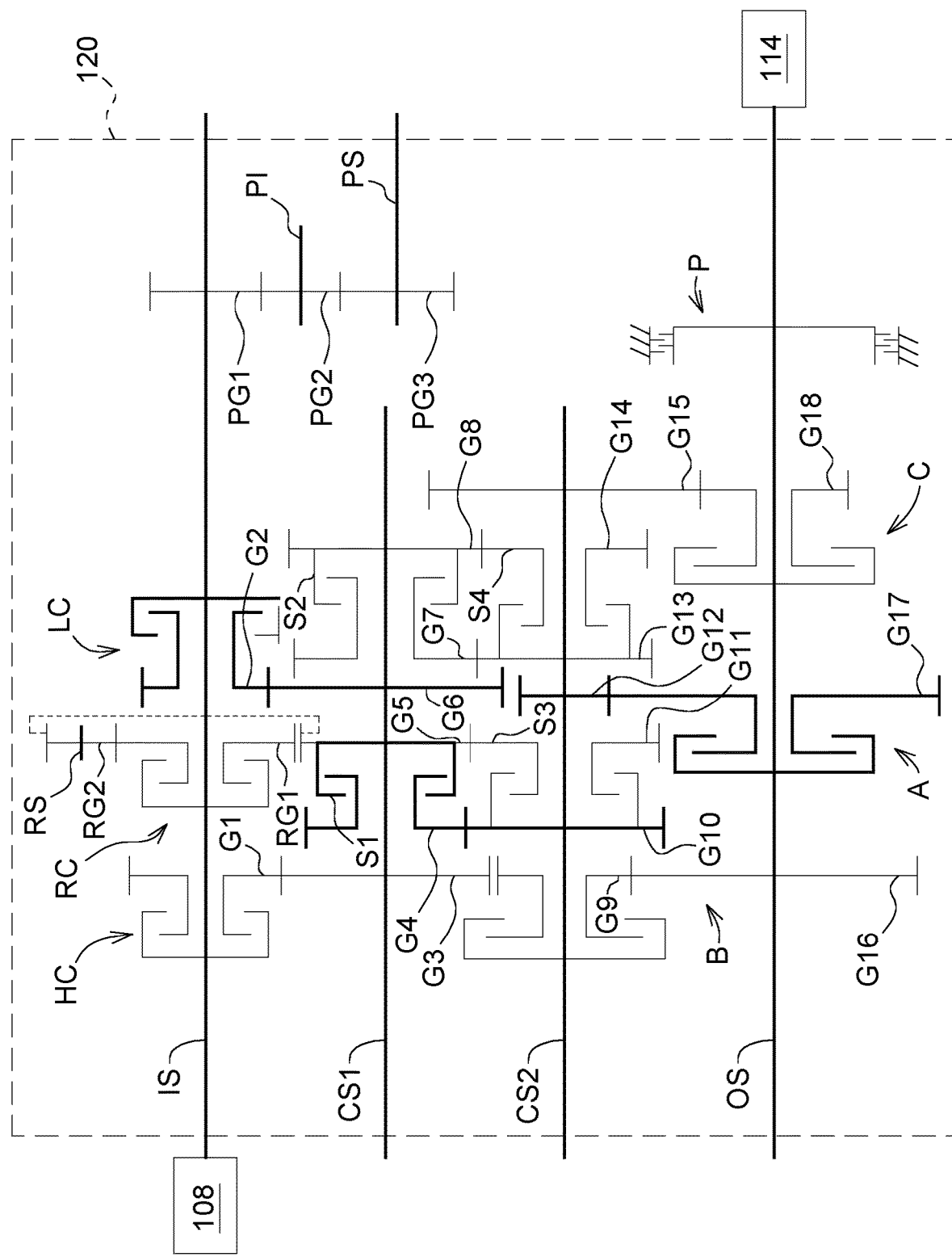
FIG. 8 is a schematic diagram of a power shift transmission illustrating the power flow in a forward mode, according to an implementation.

For example, in the first forward mode F1 as illustrated in FIG. 8, the low clutch LC, the first speed clutch S1, and the first range clutch A are engaged. When the low clutch LC is engaged, the first counter shaft CS1 rotates relative to the input shaft IS based upon the engagement or meshing between the second gear G2 and the sixth gear G6. When the first speed clutch S1 is engaged, the second counter shaft CS2 rotates relative to the first counter shaft CS1 based upon the engagement or meshing between the fourth gear G4 and the tenth gear G10. When the first range clutch A is engaged, the output shaft OS rotates relative to the second counter shaft CS2 based upon the engagement or meshing between the twelfth gear G12 and the seventeenth gear G17.

FIGS. 6 and 7A-B illustrate a transmission ratio for each forward mode based upon the engaged clutches and the resulting engaged or meshed gears, according to an implementation. The transmission ratio represents the difference in rotational speeds between the input shaft IS and the output OS of the transmission. For a transmission ratio of 5.0, the input shaft IS rotates at five times the speed of the output shaft OS, or conversely, the output shaft OS rotates at one-fifth the speed of the input shaft IS. For a transmission ratio of 0.5, the input shaft IS rotates at 0.5 times, or half, the speed of the output shaft OS, or conversely, the output shaft OS rotates at twice the speed of the input shaft IS. The transmission ratio for each mode is calculated by multiplying the ratios of the number of teeth for each group of gears.

For example, the transmission ratio for the first forward mode F1 is the ratio of the first group of gears multiplied by the ratio of the second group of gears multiplied by the ratio of the third group of gears (e.g., (G6/G3)×(G10/G4)×(G17/G12) or (77/52)×(79/50)×(82/33)=5.81). For each forward mode, the number of teeth for one or both gears can vary. The transmission 120 can include smaller or larger transmission ratios for each forward mode. The transmission 120 can have an overall transmission ratio of 14.4, which is the transmission ratio of the first forward mode F1 divided by the transmission ratio of the twenty-first forward mode F21 (e.g., 5.81/0.404=14.4). The transmission 120 can include a smaller or larger overall transmission ratio.

The percentage change, or shift step, of the transmission ratios between each consecutive or successive forward mode can be any amount. The percentage change, or shift step, between each consecutive or successive forward mode can be between 5%-25%, 10%-20%, 12%-16%, or 13%-15%. The shift step between each successive forward mode can be about 14%±1%, 2%, 5%, or 10%. The shift step between each successive forward mode can be less than 10%, 15%, 20%, or 25%. The shift step between each successive forward mode can be different, similar, or substantially equivalent. FIG. 6 illustrates the percentage change, or shift step, of the transmission ratios between each consecutive or successive forward or alternate forward mode. For example, the shift step between the first forward mode F1 and the second forward mode F2 is the difference between the transmission ratio of the first forward mode F1 and the transmission ratio of second forward mode F2 divided by the transmission ratio of the second forward mode F2, or (5.813−5.068)/(5.068)=14.7%. In addition, FIGS. 7A-B illustrate the percentage change, or shift step, of the transmission ratios between each consecutive or successive forward mode or alternate forward mode.

According to some implementations, the transmission 120 includes two or more alternate forward modes, with transmission ratios which overlap one or more forward modes. The two or more alternate forward modes provide optional or alternative forward modes. When the transmission 120 is changing or shifting forward modes, the forward mode or the alternate forward mode can be selected based upon which change or shift requires less internal energy. The shift to either a forward mode or an alternate forward mode can be determined by the rotational energy, or angular kinetic energy, of the transmission components for each of the modes.

For example, the transmission 120 can include two or more alternate forward modes between the first range A and the second range B. The transmission 120 can include three alternate forward modes between the first range A and the second range B. The alternate forward modes can be F6$a$, F7$a$, and F8$a$; F6$b$, F7$b$, and F8$b$; or any combination of these forward modes. The transmission ratios of each alternate forward mode and the corresponding forward mode can be similar, the same, or can vary by less than 1%, 2%, 5%, or 10%. In some implementations, the transmission ratio of the alternate forward mode and the corresponding forward mode vary by less than 0.2%, 1.1%, or 1.2%. In other implementations, the transmission ratios of the alternate forward modes can be anywhere between the transmission ratios of any two forward modes.

The transmission 120 can include a sixth forward mode F6$a$ in the first range A and an alternate sixth forward mode F6$b$ in the second range B. The sixth forward mode F6$a$ and the alternate sixth forward mode F6$b$ can have similar or the same transmission ratios. The transmission 120 can include a seventh forward mode F7$a$ in the first range A and an alternate seventh forward mode F7$b$ in the second range B. The seventh forward mode F7$a$ and the alternate seventh forward mode F7$b$ can have similar or the same transmission ratios. The transmission 120 can include an eighth forward mode F8$a$ in the first range A and an alternate eighth forward mode F8$b$ in the second range B. The eighth forward mode F8$a$ and the alternate eighth forward mode F8$b$ can have similar or the same transmission ratios.

Figure 9:
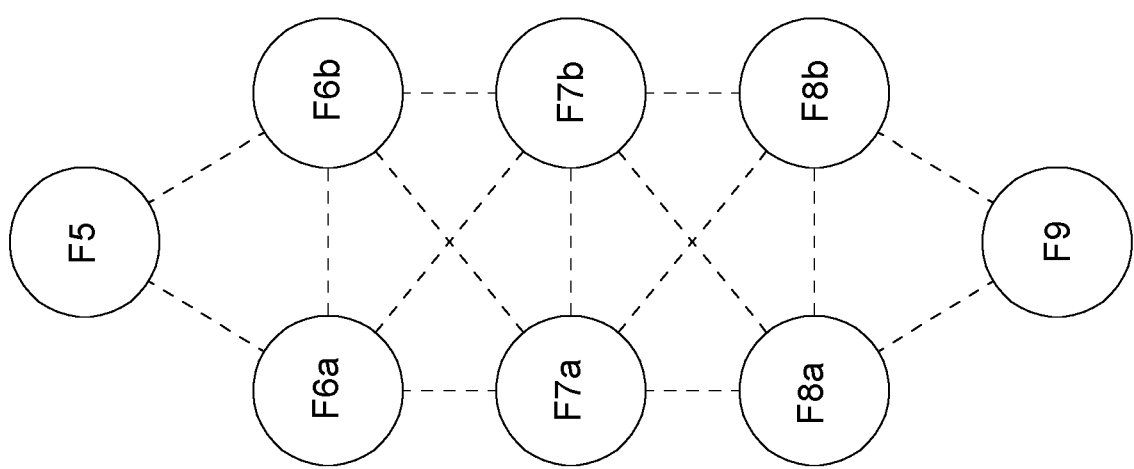
FIG. 9 is a diagram illustrating shift sequences for forward modes of a power shift transmission, according to an implementation.

With reference to FIG. 9, the transmission 120 can shift up or down through the forward modes and the alternate forward modes in any order or sequence. The transmission 120 can upshift or downshift through the forward modes, the alternate forward modes, or any combination of the forward modes and the alternate forward modes. The transmission 120 can upshift or downshift through the forward modes and the alternate forward modes in an alternating order or sequence. The transmission 120 can upshift or downshift through the first range A and the second range B without using any alternate forward modes. The transmission 120 can upshift or downshift through the first range A and the second range B using one, two, or three alternate forward modes. Any other shift order or sequence of the forward modes and the alternate forward modes is possible and within the scope of the present disclosure.

With reference to FIGS. 10 and 11, a transmission 120 can include a plurality of reverse speeds or modes. According to some implementations, the transmission 120 can include eleven reverse modes R1-R11 and one or more alternate reverse modes, which can include overlapping transmission ratios. Each of the eleven reverse modes R1-R11 has a distinct transmission ratio. For each of the reverse modes R1-R11, the reverse clutch RC is engaged; one of the first speed clutch S1, the second speed clutch S2, the third speed clutch S3, and the fourth speed clutch S4 is engaged; and one of the first range clutch A, the second range clutch B, and the third range clutch C is engaged as illustrated.

Figure 13:
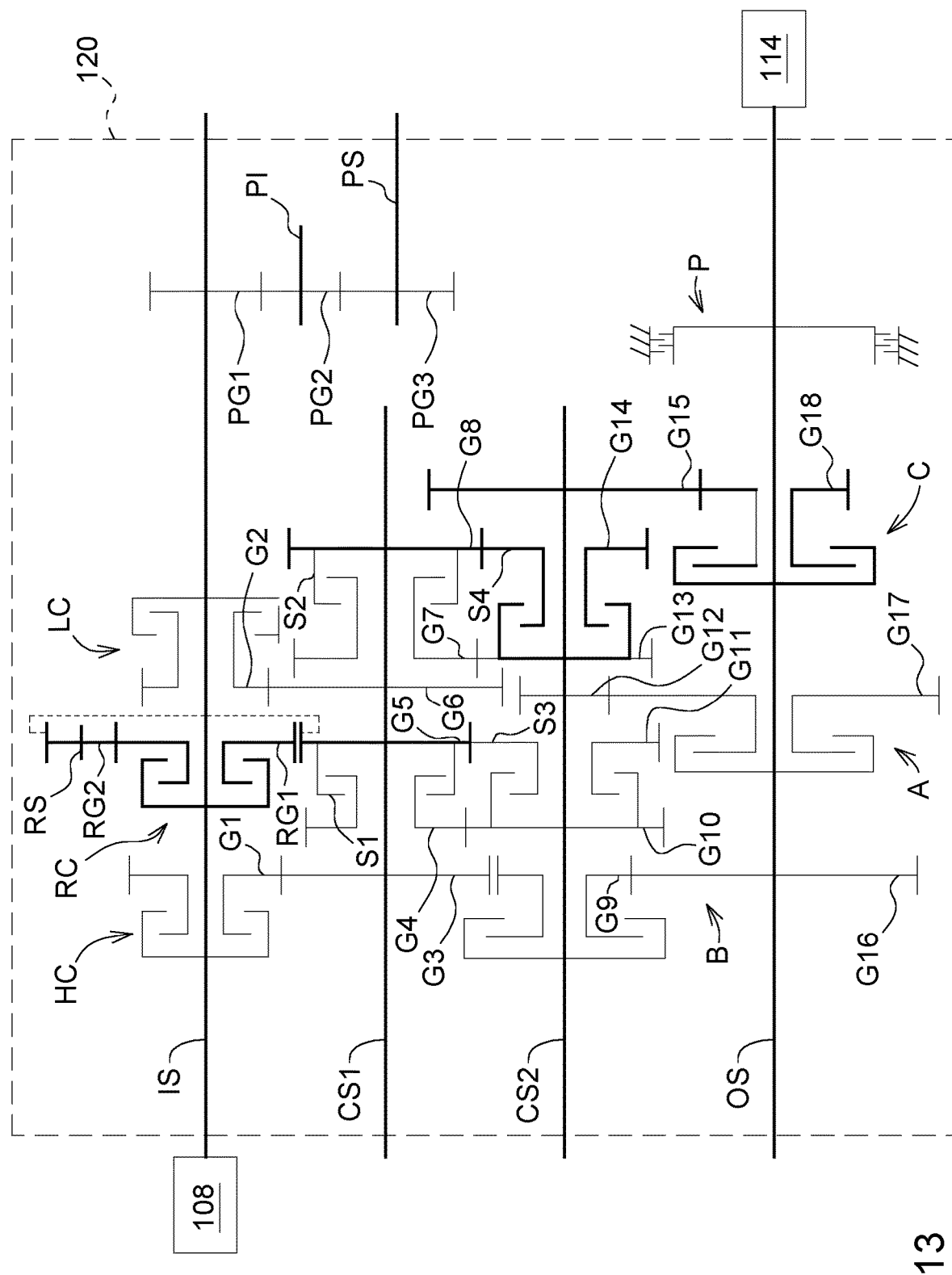
FIG. 13 is a schematic diagram of a power shift transmission illustrating the power flow in a reverse mode, according to an implementation.

For example, in the eleventh reverse mode R11 as illustrated in FIG. 13, the reverse clutch RC, the fourth speed clutch S4, and the third range clutch C are engaged. When the reverse clutch RC is engaged, the first counter shaft CS1 rotates relative to the input shaft IS based upon the engagement or meshing between the first reverse gear RG1 and the second reverse gear RG2 and the engagement or meshing between the second reverse gear RG2 and the fifth gear G5. The second reverse gear RG2 engages with both the first reverse gear RG1 and the fifth gear G5. When the fourth speed clutch S4 is engaged, the second counter shaft CS2 rotates relative to the first counter shaft CS1 based upon the engagement or meshing between the eighth gear G8 and the fourteenth gear G14. When the third range clutch C is engaged, the output shaft OS rotates relative to the second counter shaft CS2 based upon the engagement or meshing between the fifteenth gear G15 and the eighteenth gear G18.

FIGS. 11 and 12A-B illustrate a transmission ratio for each reverse mode based upon the engaged clutches and the resulting engaged or meshed gears, according to an implementation. For example, the transmission ratio for the eleventh reverse mode R11 is the ratio of the first group of gears multiplied by the ratio of the second group of gears multiplied by the ratio of the third group of gears (e.g., (G5/RG1)×(G8/G5)×(G18/G15) or (74/45)×(59/83)×(44/100)= 0.51). For each reverse mode, the number of teeth for one or both gears can vary. The transmission 120 can include smaller or larger transmission ratios for each reverse mode.

The percentage change, or shift step, of the transmission ratios between each consecutive or successive reverse mode can be any amount. The percentage change, or shift step, between each consecutive or successive reverse mode can be between 20%-40%, 25%-35%, 29%-33%, or 30%-32%. The shift step between each successive reverse mode can be about 31% ±1%, 2%, 5%, or 10%. The shift step between each successive reverse mode can be less than 30%, 35%, or 40%. The shift step between each successive reverse mode can be different, similar, or substantially equivalent. FIG. 11 illustrates the percentage change, or shift step, of the transmission ratios between each consecutive or successive reverse or alternate reverse mode. For example, the shift step between the first reverse mode R1 and the second reverse mode R2 is the difference between the transmission ratio of the first reverse mode R1 and the transmission ratio of second reverse mode R2 divided by the transmission ratio of the second reverse mode R2, or (6.456−4.966)/(4.966)= 30.0%. In addition, FIGS. 12A-B illustrate the percentage change, or shift step, of the transmission ratios between each consecutive or successive reverse mode or alternate reverse mode.

According to some implementations, the transmission 120 includes one or more alternate reverse modes, with transmission ratios which overlap one or more reverse modes. The one or more alternate reverse modes provide optional or alternative reverse modes. When the transmission 120 is changing or shifting reverse modes, the reverse mode or the alternate reverse mode can be selected based upon which change or shift requires less internal energy. The shift to either the reverse mode or the alternate reverse mode can be determined by the rotational energy, or angular kinetic energy, of the transmission components for each of the modes.

For example, the transmission 120 can include one or more alternate reverse modes between the first range A and the second range B. The transmission 120 can include one alternate reverse mode between the first range A and the second range B. The alternate reverse mode can be either R4a or R4b. The transmission ratios of the one or more alternate reverse modes and the corresponding reverse mode can be similar, the same, or can vary by less than 10%, 15%, or 20%. Alternatively, the transmission ratio of the one or more alternate reverse modes can be anywhere between the transmission ratios of any two reverse modes.

The transmission 120 can include a fourth reverse mode 4a in the first range A and an alternate fourth reverse mode R4b in the second range B. The transmission ratio of the alternate fourth reverse mode R4b can be positioned between the third reverse mode R3 and the fourth reverse mode F4a. The transmission ratio of the alternate fourth reverse mode R4b can be positioned about half-way between the transmission ratios of the third reverse mode R3 and the fourth reverse mode F4a. The transmission ratio of the fourth reverse mode R4a can be positioned about half-way between the transmission ratios of the alternate fourth reverse mode R4b and the fifth reverse mode R5.

Figure 14:
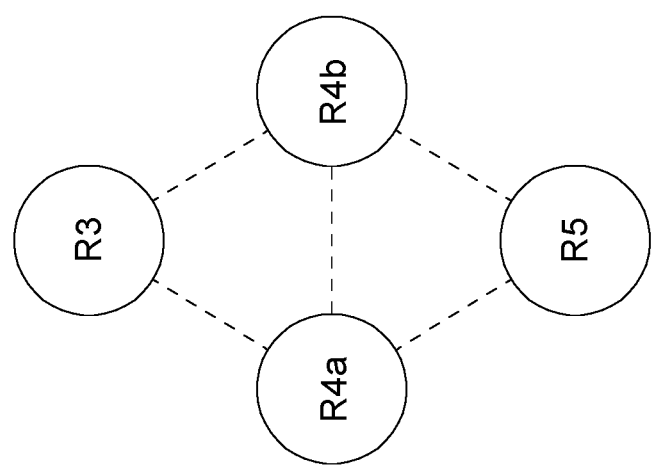
FIG. 14 is a diagram illustrating shift sequences for reverse modes of a power shift transmission, according to an implementation.

With reference to FIG. 14, the transmission 120 can shift up or down through the reverse modes and the alternate reverse modes in any order or sequence. The transmission 120 can upshift or downshift through the reverse modes, the alternate reverse modes, or any combination of the reverse modes and the alternate reverse modes. The transmission 120 can upshift or downshift through the reverse modes and the alternate reverse modes in an alternating order or sequence. The transmission 120 can upshift or downshift through the first range A and the second range B without using any alternate reverse modes. The transmission 120 can upshift or downshift through the first range A and the second range B using one alternate reverse mode. Any other shift order or sequence of the reverse modes and the alternate reverse modes is possible and within the scope of the present disclosure.

Figure 15:
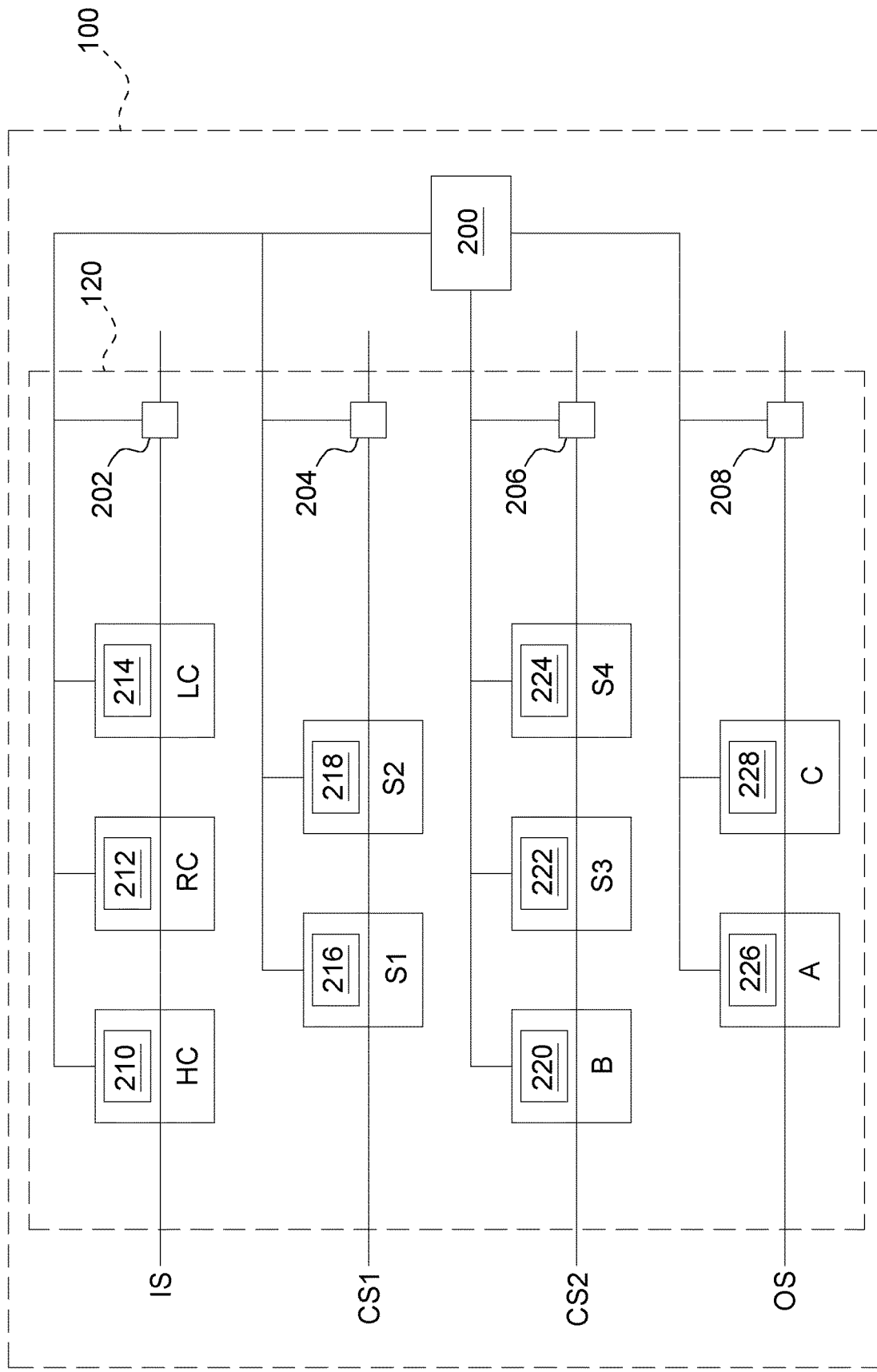
FIG. 15 is a schematic diagram of a power shift transmission, according to an implementation.

With reference to FIG. 15, an electronic control unit or controller 200 can have one or more microprocessor-based electronic control units or controllers, which perform calculations and comparisons and execute instructions. The controller includes a processor, a core, volatile and non-volatile memory, digital and analog inputs, and digital and analog outputs. The controller can include non-transitory, computer readable memory, such as random-access memory (RAM), read only memory (ROM), or electrically erasable programmable read only memory (EEPROM), which include instructions for execution by the processor. The controller connects to and communicates with various input and output devices including, but not limited to, switches, relays, solenoids, actuators, light emitting diodes (LED's), passive and interactive displays, radio frequency devices (RFD's), sensors, and other controllers. The controller receives communications or signals, via electrically or any suitable electromagnetic communication, from one or more devices, determines an appropriate response or action, and sends communications or signals to one or more devices. The controller can be a microprocessor, an application specific integrated circuit (ASIC), a digital processor, or a programmable logic controller, also known as a PLC or programmable controller. The controller can connect to and communicate with an electronic control system of the work vehicle 100, the transmission 120, or both through a data bus, such as a CAN bus, or the controller can be a part the electronic control system of the work vehicle 100, the transmission 120, or both.

The transmission 120 can include a variety of sensors to detect or measure various properties of the transmission 120. The transmission 120 can include one or more sensors 204, 206, 208, 210 to sense or measure the speed, torque, or both of each transmission shaft IS, CS1, CS2, OS. The transmission 120 can include one or more sensors 212, 214, 216, 218, 220, 222, 224, 226, 228, 230 to sense or measure when the transmission clutches LC, HC, RC, S1, S2, S3, S4, A, B, C are engaged or disengaged. The controller 200 can connect to and communicate with the sensors 204, 206, 208, 210, 212, 214, 216, 218, 220, 222, 224, 226, 228, 230 and other electronic devices on the work vehicle 100 or transmission 120. The controller 200 can determine the speed of each transmission shaft and the engaged status of each clutch. The controller 200 can determine the rotational energy, or angular kinetic energy, of each transmission shaft including the gears and clutches. The controller 200 can determine the difference between the rotational energy of a current mode and one or more future modes, a current mode and one or more previous modes, or both.

During operation of the transmission 120, the controller 200 can determine whether to change or shift from a current forward mode to a proposed forward mode or to a proposed alternate forward mode based in part upon the difference in the total rotational energy between the current mode and proposed modes. The controller 200 can determine the difference in rotational energy for each transmission shaft, including the gears and clutches on each transmission shaft, between the modes. Alternatively, or additionally, the controller 200 can determine whether to shift to the forward mode or to the alternate forward mode based in part upon the difference in rotational energy for each transmission shaft having a clutch with a change required for the shift or change in modes. The controller 200 can determine whether to shift to the forward mode or to the alternate forward mode based in part on additional considerations or factors including, but not limited to, vehicle speed, vehicle acceleration, engine speed, engine torque, transmission shaft speed, transmission torque, final drive torque, powertrain load, and drivetrain load.

During operation of the transmission 120, the controller 200 can determine whether to change or shift from a current reverse mode to a proposed reverse mode or to a proposed alternate reverse mode based in part upon the difference in the total rotational energy between the current mode and proposed modes. The controller 200 can determine the difference in rotational energy for each transmission shaft, including the gears and clutches on each transmission shaft, between the modes. Alternatively, or additionally, the controller 200 can determine whether to shift to the reverse mode or to the alternate reverse mode based in part upon the difference in rotational energy for each transmission shaft having a clutch with a change required for the shift or change in modes. The controller 200 can determine whether to shift to the reverse mode or to the alternate reverse mode based in part on additional considerations or factors including, but not limited to, vehicle speed, vehicle acceleration, engine speed, engine torque, transmission shaft speed, transmission torque, final drive torque, powertrain load, and drivetrain load.

Figure 16:
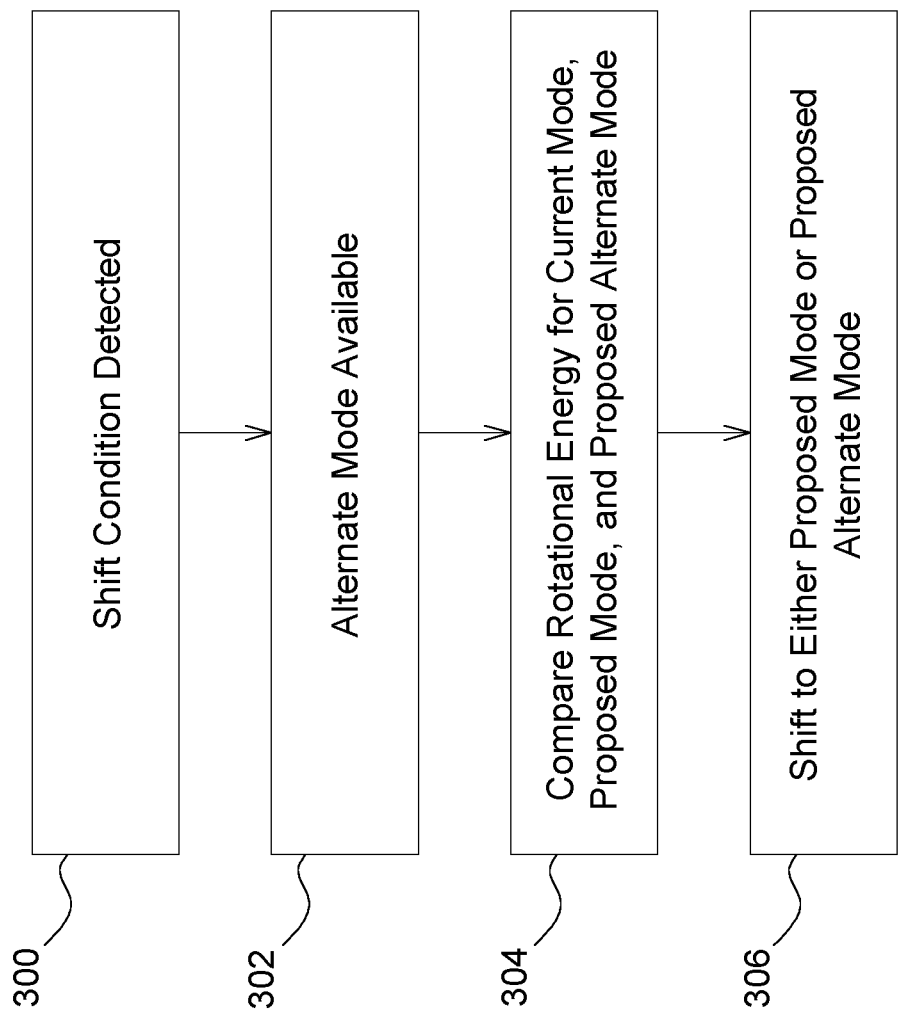
FIG. 16 is a flow diagram of a power shift transmission, according to an implementation.

FIG. 16 illustrates a method of shifting speeds or modes in a transmission 120, which may be utilized in one or more of the implementations described herein and depicted in the various FIGURES.

At step 300, a shift condition is detected. The controller 200 can determine whether the transmission 120 is in a condition to shift up (upshift) or shift down (downshift). The transmission 120 can shift up or shift down automatically based on one or more of the considerations or factors disclosed herein or other considerations or factors. The transmission 120 can be shifted up or down manually via a gearshift, electronic display, or other operator interface.

At step 302, when the controller 200 determines the transmission 120 is in a shift condition, then the controller 200 determines whether there is an alternate mode available for the upshift or downshift. If the work vehicle 100 is moving forward, then the controller 200 determines whether an alternate forward mode is available. If the work vehicle 100 is moving backwards or in reverse, then the controller 200 determines whether an alternate reverse mode is available.

At step 304, if the controller 200 determines an alternate mode is available, then the controller 200 compares the rotational energy, or angular kinetic energy, of one or more transmission shafts, including the gears and clutches of each transmission shaft, for the current mode, the proposed mode, and the proposed alternate mode. For example, when the transmission 120 is in the fifth forward mode F5 and the controller 200 determines the transmission 120 is in an upshift condition, then the controller 200 calculates, or utilizes a lookup table in a database, the rotational energy of transmission shafts in the fifth forward mode F5, the sixth forward mode F6a, and the alternate sixth forward mode F6b. The controller 200 compares the rotational energy of the transmission shafts in the fifth forward mode F5 to the sixth forward mode F6a and to the alternate sixth forward mode F6b. The controller 200 can calculate the difference in rotational energy between the modes for one or more of the transmission shafts or for the transmission shafts which include clutch changes.

At step 306, the controller 200 can determine whether to shift to the sixth forward mode F6a or to the alternate sixth forward mode F6b. The controller 200 can determine which future mode to select based upon which shift, to the proposed mode or the proposed alternate mode, has the smaller rotational energy difference for one or more of the transmission shafts as compared to the current mode. Alternatively, or additionally, the controller 200 can determine which future mode to select based upon which shift has the smaller rotational energy difference for the one or more transmission shafts with clutch changes. The controller 200 then shifts the transmission 120 to the selected future mode. In other implementations, one or more of these steps, processes, or operations may be omitted, repeated, re-ordered, combined, or separated and still achieve the desired results.

Without in any way limiting the scope, interpretation, or application of the claims appearing below, a technical effect of one or more of the example implementations disclosed herein is a power shift transmission including similar shift steps between each forward mode and reverse mode. Another technical effect of one or more of the example implementations disclosed herein is a power shift transmission having small shift steps between the forward and the reverse modes. These small shift steps between the forward and the reverse modes promote smooth mode changes and enhance operator comfort when changing modes. Another technical effect of one or more of the example implementations disclosed herein is a power shift transmission utilizing eighteen gears and nine clutches to generate at least twenty-one forward modes. This reduces the number of parts required to produce the power shift transmission, which minimizes production costs. Another technical effect of one or more of the example embodiments disclosed herein is a power shift transmission utilizing an additional two gears and one clutch to generate at least eleven reverse modes.

The terminology used herein is for describing particular implementations and is not intended to be limiting of the present disclosure. As used herein, the singular forms "a," "an," and "the" are intended to include the plural forms as well, unless the context clearly indicates otherwise. It will be further understood that any use of the terms "has," "includes," "comprises," or the like, in this specification, identifies the presence of one or more stated features, integers, steps, operations, elements, and components, but does not preclude the presence or addition of one or more other features, integers, steps, operations, elements, components, and groups thereof. One or more of the steps or operations in any of the methods, processes, or systems discussed herein may be omitted, repeated, re-ordered, combined, or separated and are within the scope of the present disclosure.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example implementations of the present disclosure, these descriptions should not be viewed in a restrictive or limiting sense. Rather, there are several variations and modifications which may be made without departing from the scope of the appended claims.

What is claimed is:

1. A power shift transmission, comprising:
a plurality of shafts including a first shaft, a second shaft, a third shaft, and a fourth shaft;
a plurality of gears including a first gear, a second gear, a third gear, a fourth gear, a fifth gear, a sixth gear, a seventh gear, an eighth gear, a ninth gear, a tenth gear, an eleventh gear, a twelfth gear, a thirteenth gear, a fourteenth gear, a fifteenth gear, a sixteenth gear, a seventeenth gear, and an eighteenth gear;
a plurality of clutches including a first clutch, a second clutch, a third clutch, a fourth clutch, a fifth clutch, a sixth clutch, a seventh clutch, an eighth clutch, and a ninth clutch;
a plurality of forward modes, each forward mode including a distinct transmission ratio; and
a plurality of alternate forward modes, each alternate forward mode including a transmission ratio similar to one of the plurality of forward modes.

2. The power shift transmission of claim 1, wherein:
the first shaft includes the first gear and the second gear;
the second shaft includes the third gear, the fourth gear, the fifth gear, the sixth gear, the seventh gear, and the eighth gear;
the third shaft includes the ninth gear, the tenth gear, the eleventh gear, the twelfth gear, the thirteenth gear, the fourteenth gear, and the fifteenth gear;
the fourth shaft includes the sixteenth gear, the seventeenth gear, and the eighteenth gear;
the first clutch having an engaged condition, which causes the second shaft to rotate relative to the first shaft based upon the engagement between the third gear and the first gear;
the second clutch having an engaged condition, which causes the second shaft to rotate relative to the first shaft based upon the engagement between the sixth gear and the second gear;
the third clutch having an engaged condition, which causes the third shaft to rotate relative to the second shaft based upon the engagement between the tenth gear and the fourth gear;
the fourth clutch having an engaged condition, which causes the third shaft to rotate relative to the second shaft based upon the engagement between the thirteenth gear and the seventh gear;
the fifth clutch having an engaged condition, which causes the third shaft to rotate relative to the second shaft based upon the engagement between the eleventh gear and the fifth gear;
the sixth clutch having an engaged condition, which causes the third shaft to rotate relative to the second shaft based upon the engagement between the fourteenth gear and the eighth gear;
the seventh clutch having an engaged condition, which causes the fourth shaft to rotate relative to the third shaft based upon the engagement between the seventeenth gear and the twelfth gear;
the eighth clutch having an engaged condition, which causes the fourth shaft to rotate relative to the third shaft based upon the engagement between the sixteenth gear and the ninth gear; and
the ninth clutch having an engaged condition, which causes the fourth shaft to rotate relative to the third shaft based upon the engagement between the eighteenth gear and the fifteenth gear.

3. The power shift transmission of claim 1, wherein:
the plurality of forward modes includes at least twenty-one forward modes; and
the plurality of alternate forward modes includes at least three alternate forward modes.

4. The power shift transmission of claim 1, wherein:
the plurality of forward modes includes a sixth forward mode and a seventh forward mode;
the plurality of alternate forward modes include an alternate sixth forward mode and an alternate seventh forward mode;
the sixth forward mode and the alternate sixth forward mode have similar transmission ratios; and
the seventh forward mode and the alternate seventh forward mode have similar transmission ratios.

5. The power shift transmission of claim 4, wherein:
the plurality of forward modes includes an eighth forward mode;
the plurality of alternate forward modes include an alternate eighth forward mode; and
the eighth forward mode and the alternate eighth forward mode have similar transmission ratios.

6. The power shift transmission of claim 2, wherein:
the plurality of forward modes includes a fifth forward mode and a shift step between the fifth forward mode and the sixth forward mode is between 10% and 20%.

7. The power shift transmission of claim 2, wherein:
the transmission ratio of the alternate sixth forward mode is within 10% of the transmission ratio of the sixth forward mode;
the transmission ratio of the alternate seventh forward mode is within 10% of the transmission ratio of the seventh forward mode; and
the transmission ratio of the alternate eighth forward mode is within 10% of the transmission ratio of the eighth forward mode.

8. The power shift transmission of claim 2, wherein:
the transmission ratio of the alternate sixth forward mode is within 5% of the transmission ratio of the sixth forward mode;
the transmission ratio of the alternate seventh forward mode is within 5% of the transmission ratio of the seventh forward mode; and
the transmission ratio of the alternate eighth forward mode is within 5% of the transmission ratio of the eighth forward mode.

9. The power shift transmission of claim 2, wherein:
the transmission ratio of the alternate sixth forward mode is within 2% of the transmission ratio of the sixth forward mode;
the transmission ratio of the alternate seventh forward mode is within 2% of the transmission ratio of the seventh forward mode; and
the transmission ratio of the alternate eighth forward mode is within 2% of the transmission ratio of the eighth forward mode.

10. The power shift transmission of claim 1, further comprising:
a first reverse gear operatively connected to the first shaft;
a second reverse gear operatively connected to a reverse shaft;
a reverse clutch having an engaged condition, which causes the second shaft to rotate relative to the first shaft based upon the engagement between the second reverse gear and the first reverse gear and the engagement between the fifth gear and the second reverse gear;
a plurality of reverse modes, each reverse mode including a distinct transmission ratio; and
at least one alternate reverse mode having a transmission ratio between any two of the reverse modes.

11. The power shift transmission of claim 10, wherein:
the plurality of reverse modes includes a third reverse mode, a fourth reverse mode, and a fifth reverse mode;
the at least one alternate reverse mode includes an alternate fourth reverse mode; and
the fourth reverse mode and the alternate fourth reverse mode each have a transmission ratio between a transmission ratio of the third reverse mode and a transmission ratio of the fifth reverse mode.

12. The power shift transmission of claim 11, wherein a shift step between the third reverse mode and the fourth reverse mode is between 25% and 35%.

13. The power shift transmission of claim 11, wherein the transmission ratio of the alternate fourth reverse mode is within 20% of the transmission ratio of the fourth reverse mode.

14. A work vehicle including a power shift transmission, comprising:
a first shaft including a first gear and a second gear;
a second shaft including a third gear, a fourth gear, a fifth gear, a sixth gear, a seventh gear, and an eighth gear;
a third shaft including a ninth gear, a tenth gear, an eleventh gear, a twelfth gear, a thirteenth gear, a fourteenth gear, and a fifteenth gear;
a fourth shaft including a sixteenth gear, a seventeenth gear, and an eighteenth gear;
a first clutch having an engaged condition, which causes the second shaft to rotate relative to the first shaft based upon the engagement between the third gear and the first gear;
a second clutch having an engaged condition, which causes the second shaft to rotate relative to the first shaft based upon the engagement between the sixth gear and the second gear;
a third clutch having an engaged condition, which causes the third shaft to rotate relative to the second shaft based upon the engagement between the tenth gear and the fourth gear;
a fourth clutch having an engaged condition, which causes the third shaft to rotate relative to the second shaft based upon the engagement between the thirteenth gear and the seventh gear;
a fifth clutch having an engaged condition, which causes the third shaft to rotate relative to the second shaft based upon the engagement between the eleventh gear and the fifth gear;
a sixth clutch having an engaged condition, which causes the third shaft to rotate relative to the second shaft based upon the engagement between the fourteenth gear and the eighth gear;
a seventh clutch having an engaged condition, which causes the fourth shaft to rotate relative to the third shaft based upon the engagement between the seventeenth gear and the twelfth gear;
an eighth clutch having an engaged condition, which causes the fourth shaft to rotate relative to the third shaft based upon the engagement between the sixteenth gear and the ninth gear;
a ninth clutch having an engaged condition, which causes the fourth shaft to rotate relative to the third shaft based upon the engagement between the eighteenth gear and the fifteenth gear;
at least twenty-one forward modes, each forward mode including a distinct transmission ratio; and
at least two alternate forward modes, each alternate forward mode having a transmission ratio similar to one of the at least twenty-one forward modes.

15. The work vehicle of claim 14, wherein:
the at least twenty-one forward modes include a sixth forward mode and a seventh forward mode;
the at least two alternate forward modes include an alternate sixth forward mode and an alternate seventh forward mode;
the sixth forward mode and the alternate sixth forward mode have similar transmission ratios; and
the seventh forward mode and the alternate seventh forward mode have similar transmission ratios.

16. The work vehicle of claim 15, wherein:
the at least twenty-one forward modes include an eighth forward mode;
the at least two alternate forward modes include an alternate eighth forward mode; and
the eighth forward mode and the alternate eighth forward mode have similar transmission ratios.

17. The work vehicle of claim 15, wherein:
the at least twenty-one forward modes include a fifth forward mode; and
a shift step between the fifth forward mode and the sixth forward mode is between 10% and 20%.

18. The work vehicle of claim 15, wherein:
the transmission ratio of the alternate sixth forward mode is within 10% of the transmission ratio of the sixth forward mode;
the transmission ratio of the alternate seventh forward mode is within 10% of the transmission ratio of the seventh forward mode; and
the transmission ratio of the alternate eighth forward mode is within 10% of the transmission ratio of the eighth forward mode.

19. The work vehicle of claim 15, wherein:
the transmission ratio of the alternate sixth forward mode is within 5% of the transmission ratio of the sixth forward mode;
the transmission ratio of the alternate seventh forward mode is within 5% of the transmission ratio of the seventh forward mode; and
the transmission ratio of the alternate eighth forward mode is within 5% of the transmission ratio of the eighth forward mode.

20. The work vehicle of claim 15, wherein:
the transmission ratio of the alternate sixth forward mode is within 2% of the transmission ratio of the sixth forward mode;
the transmission ratio of the alternate seventh forward mode is within 2% of the transmission ratio of the seventh forward mode; and
the transmission ratio of the alternate eighth forward mode is within 2% of the transmission ratio of the eighth forward mode.

21. The work vehicle of claim 15, further comprising:
a first reverse gear operatively connected to the first shaft;
a second reverse gear operatively connected to a reverse shaft;
a reverse clutch having an engaged condition, which causes the second shaft to rotate relative to the first shaft based upon the engagement between the second reverse gear and the first reverse gear and the engagement between the fifth gear and the second reverse gear;
at least eleven reverse modes, each reverse mode including a distinct transmission ratio; and
at least one alternate reverse mode having a transmission ratio between any two of the reverse modes.

22. The work vehicle of claim 21, wherein:
the at least eleven reverse modes include a third reverse mode, a fourth reverse mode, and a fifth reverse mode;
the at least one alternate reverse mode includes an alternate fourth reverse mode; and
the fourth reverse mode and the alternate fourth reverse mode each have a transmission ratio between a transmission ratio of the third reverse mode and a transmission ratio of the fifth reverse mode.

23. The work vehicle of claim 22, wherein:
a shift step between the third reverse mode and the fourth reverse mode is between 25% and 35%; and
the transmission ratio of the alternate fourth reverse mode is within 20% of the transmission ratio of the fourth reverse mode.

24. A method of shifting a power shift transmission, comprising:
determining via a controller a current forward mode from a plurality of forward modes, which includes at least twenty-one forward modes with each having a distinct transmission ratio;
determining via the controller connected to at least one sensor a shift condition from the current forward mode to a proposed forward mode from the plurality of forward modes;
determining via the controller whether a proposed alternate forward mode from a plurality of alternate forward modes, which includes at least three alternate forward modes with each having a transmission ratio similar to one of the plurality of forward modes, is available for the shift condition, the proposed alternate forward mode having a similar transmission ratio as the proposed forward mode;
determining via the controller the difference in rotational energy between the current forward mode and the proposed forward mode;
determining via the controller the difference in rotational energy between the current forward mode and the proposed alternate forward mode; and
shifting via the controller one of the proposed forward mode and the proposed alternate forward mode based in part on the smaller difference in rotational energy.

25. A power shift transmission, comprising:
a plurality of shafts;
a plurality of gears;
a plurality of clutches;
a plurality of forward modes including at least twenty-one forward modes, each forward mode including a distinct transmission ratio; and
a plurality of alternate forward modes including at least three alternate forward modes, each alternate forward mode including a transmission ratio similar to one of the plurality of forward modes.

26. The power shift transmission of claim 25, wherein:
the at least twenty-one forward modes includes a sixth forward mode and a seventh forward mode;
the at least three alternate forward modes include an alternate sixth forward mode and an alternate seventh forward mode;
the sixth forward mode and the alternate sixth forward mode have similar transmission ratios; and
the seventh forward mode and the alternate seventh forward mode have similar transmission ratios.

27. The power shift transmission of claim 26, wherein:
the at least twenty-one forward modes includes an eighth forward mode;
the at least three alternate forward modes include an alternate eighth forward mode; and
the eighth forward mode and the alternate eighth forward mode have similar transmission ratios.

* * * * *